United States Patent [19]
Cattin et al.

[11] 3,757,603
[45] Sept. 11, 1973

[54] DUAL ROLLER THROTTLE CONTROL-CABLE MECHANISM

[75] Inventors: Walter J. Cattin, Clarkston, Mich.; Edgar C. Paffrath, Frankenmuth, Mich.

[73] Assignee: General Motors Corporation, Detroit, Mich.

[22] Filed: July 31, 1972

[21] Appl. No.: 276,642

[52] U.S. Cl. ............... 74/513, 74/501 R, 74/560
[51] Int. Cl. ........................ G05g 1/14, F16c 1/10
[58] Field of Search ............... 74/501 R, 512, 513, 74/560, 561

[56] References Cited
UNITED STATES PATENTS
2,504,286  4/1950  Wahlberg et al. .................. 74/513
3,365,978  1/1968  Kirby et al. ...................... 74/501 R

*Primary Examiner*—Allan D. Hermann
*Attorney*—J. L. Carpenter and Peter D. Sachtjen

[57] ABSTRACT

An adjustable cable mechanism for operatively interconnecting an engine throttle with an adjustable accelerator pedal includes a control cable threaded from a fixed location along a first cable run to and serially around a fixed first roller and a pivotable second roller mounted on a pedal actuated control lever, and therefrom to the throttle along a second cable run. Pedal actuation pivots the control lever and the second roller to shift the second cable run and thereby control opening of the throttle. The rollers are mounted on an adjustable bracket for changing the relative lengths of the cable runs without changing the overall length of cable to permit fore and aft adjustment of the control lever for accommodating varying pedal positions.

2 Claims, 5 Drawing Figures

PATENTED SEP 11 1973 3,757,603

DUAL ROLLER THROTTLE CONTROL-CABLE MECHANISM

The present invention relates to throttle control cable mechanisms and, in particular, to an adjustable throttle control cable mechanism for use with an adjustable accelerator pedal.

In motor vehicles having an adjustable pedal system for accommodating different drivers and different seat locations, the accelerator pedal is selectively movable to an optimum adjusted position for each driver. The present invention provides this feature by use of a dual roller cable control mechanism which is readily adjustable relative to the accelerator pedal without a change in overall length of the control cable as a result of such an adjustment.

The above and other features of the present invention will be apparent to one skilled in the art upon reading the following detailed description, reference being made to the accompanying drawings illustrated a preferred embodiment of the present invention in which.

Figure 1:
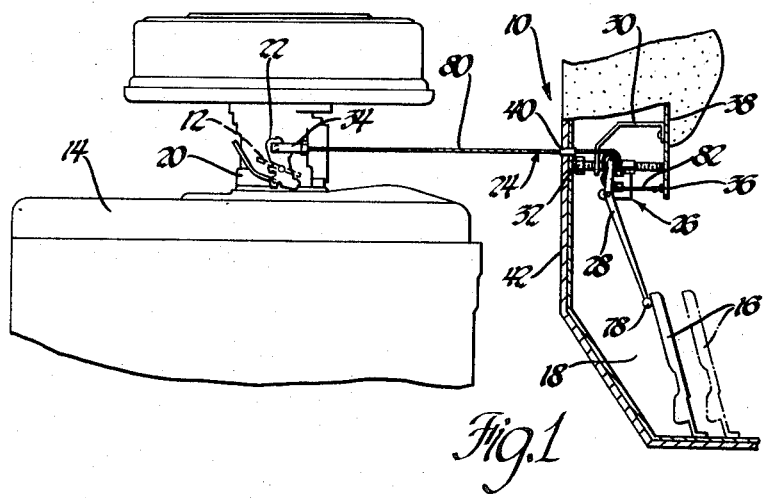
FIG. 1 is a side elevational view of a dual roller throttle cable control mechanism for operatively interconnecting the throttle of an engine with an adjustable accelerator pedal.

Referring to FIG. 1, there is shown a dual roller throttle cable control mechanism 10 for operatively interconnecting the throttle 12 of an internal combustion engine 14 with an adjustable accelerator pedal 16 mounted in the passenger compartment 18 of a motor vehicle. The throttle 12 is conventionally mounted on the carburetor 20 and is controlled in accordance with rotation of a throttle actuator lever 22. The accelerator pedal 16 is part of an adjustable pedal system, not shown, the details of which form no part of the present invention. For purposes of description, it is sufficient to note that accelerator pedal 16 is movable between a first position shown by the solid lines and a second position shown by the dotted lines.

The dual roller cable control mechanism 10 comprises a control cable 24, an adjustable bracket 26, an accelerator control lever 28, a support arm 30, and a bracket adjusting screw 32.

The control cable 24 comprises helically wound strands of flexible wires or cords and has a first end 34 fixed to the upper end of the throttle actuator lever 22 and a second end 36 fixed to a plate 38 mounted on the vehicle dashboard in the passenger compartment 18. The control cable 24 extends through a bushing or sheath 40 in the vehicle firewall 42.

Figure 2:
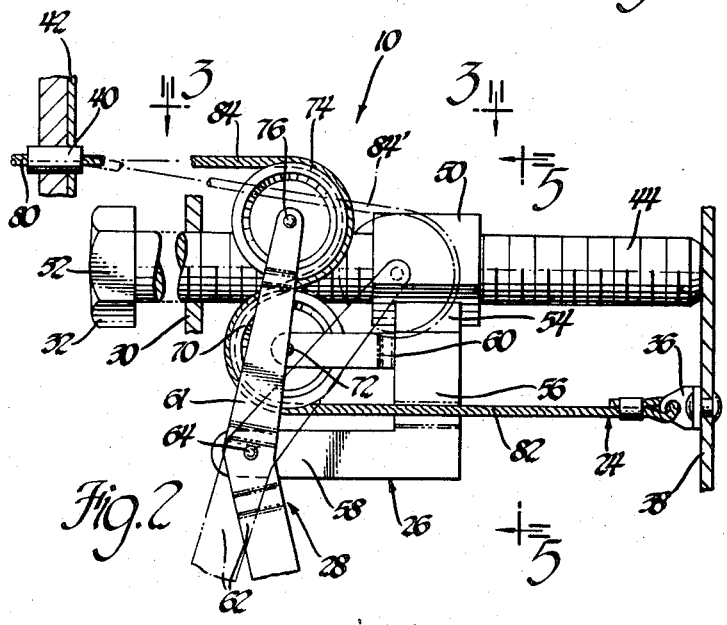
FIG. 2 is an enlarged elevational view of the dual roller throttle cable control mechanism showing the throttle closed position and the throttle open position.
Figure 3:
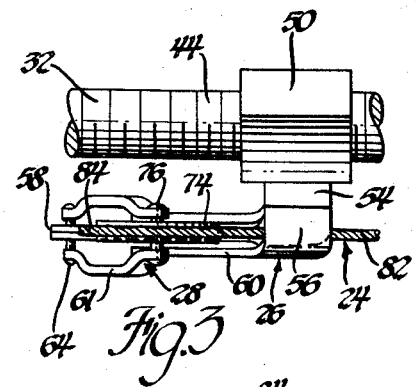
FIG. 3 is a view taken along line 3—3 of FIG. 2 showing the mounting of the dual rollers.

Referring to FIG. 2, the adjusting screw 32 includes a threaded shank 44 which is rotatably connected to the lower end of the support arm 30. The support arm 30 is connected at an upper end to the plate 38. The terminal end of the shank 44 engages the plate 38. The bracket 26 includes a square nut 50 which is threadably received over the shank 44 of the adjusting screw 32. By rotation of the head 52 of the adjusting screw 32, the bracket 26 is horizontally shifted along the shank 44. An L-shaped bracket 54 is fixed to the nut 50 and depends downwardly and laterally therefrom. The bracket 54 includes a downwardly projecting vertical arm 56 terminating with a forwardly projecting horizontal arm 58. A horizontal bracket 60 comprising a pair of laterally spaced horizontal arms is fixedly connected to the vertical arm 56 above the arm 58.

The control lever 28 has a shallow V-shape and is formed of two stampings, one of which is the mirror image of the other. The control lever 28 includes an upper leg 61 and a lower leg 62. The control lever 28 is centrally pivotally connected to the forward part of the horizontal arm 58 by a pin 64. A first roller 70 is rotatably connected at the forward end of the bracket 60 by a pin 72. A second roller 74 is rotatably connected at the upper portion of the leg 61 of lever 28 by a pin 76. Both rollers 70, 74 have a circumferential groove for guidingly retaining the control cable 24.

Figure 5:
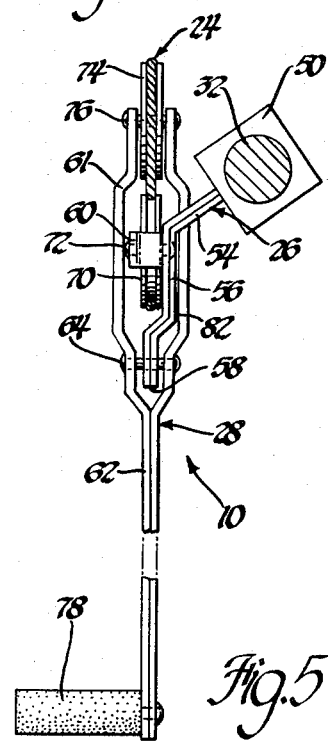
FIG. 5 is a view taken along line 5—5 of FIG. 2.

As shown in FIG. 5, a cylindrical pedal engaging rod 78 is fixedly connected to the lower end of the control lever 28 and projects laterally therefrom. The rod 78 is adapted to engage the rear surface of the accelerator pedal 16. Depression of the pedal 16 thus pivots the lever 28 clockwise about the pin 64.

The control cable 24 is serially threaded from the throttle actuating lever 22 through the bushing 40 to the second roller 74 along an upper cable run 80, around the roller 74 to and around the roller 70 along an intermediate run, from the roller 70 to the end 36 along a lower cable run 82. The length of cable between the bushing 40 and the first roller 70 constitutes a variable length cable run 84.

As the control lever 28 is pivoted between the solid line position and the dotted line position, the roller 74, as shown in FIG. 2, traverses an arc about the pin 64. This rotation increases the length of the variable cable run 84'. During this travel, the roller 70 rotates to eliminate cable slip and the degrees of wrap around the rollers 70, 74 increases thereby increasing the length of the intermediate run. The increase in the lengths of these runs will cause a corresponding reduction in the effective length between the end 34 and the firewall 42 which will cause the throttle actuating lever 22 to rotate in a throttle opening direction.

Figure 4:
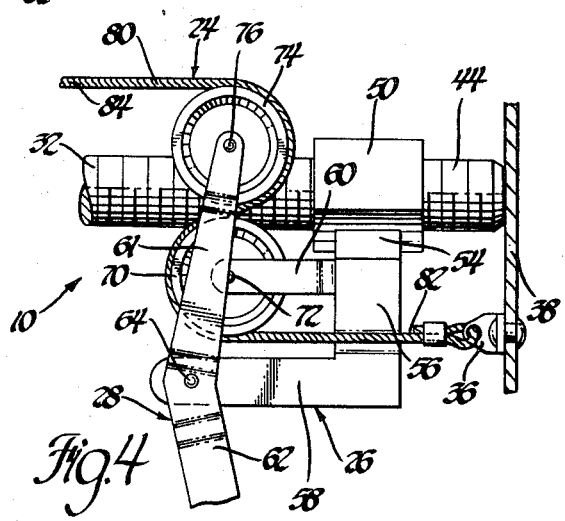
FIG. 4 is a view similar to FIG. 2 showing the dual roller throttle cable control mechanism in a second operative position.

To adjust the mechanism 10 to compensate for a different position of the pedal 16, the screw 32 is rotated to shift the bracket 26 from the position shown in FIG. 2 to the position shown in FIG. 4. The effect of this shifting is to change the relative lengths of the cable runs 80 and 82 without a change in overall cable length. In other words if the bracket moves to the right, the run 80 will increase in length the same amount as the decrease in the length of cable run 82, the rollers 70, 74 rotating freely to accommodate this change in position. In the second position, the mechanism 10 is actuated in the same manner to vary the length of the run 84 to cause corresponding movement of the throttle actuating lever 22.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In a motor vehicle having an engine with a throttle operable in response to movement of a pedal, an adjustable control cable mechanism operatively interconnecting the throttle and the pedal comprising: a bracket; support means for mounting said bracket on the vehicle in adjustable relationship to the throttle and the pedal; a first roller member supported on said bracket; a lever pivotally connected to said bracket; a first portion of said lever engaging the pedal so as to be pivoted by movement thereof; a second roller member supported on a second portion of said lever; a flexible control member connected at one end to the throttle and at the other end to the vehicle, said control member being serially threaded from the throttle around one of said roller members, to and around the other of said roller members, and therefrom to said vehicle whereby movement of the pedal causes pivoting of said lever and said second roller member relative to said first roller member thereby changing the length of said control member between said second roller member, the throttle and said support means to impart controlled movement to the throttle.

2. In a motor vehicle having an engine with a throttle rotatable in response to pivotal movement of an adjustable pedal, an adjustable throttle control cable mechanism operatively interconnecting the throttle and the pedal for accommodating changes in pedal position comprising: a bracket; an adjusting screw operatively connected to said bracket; support means associated with said adjusting screw for adjustably mounting said bracket on the vehicle; a first roller rotatably supported on said bracket; a lever centrally pivotally connected to said bracket; a first portion of said lever engaging the pedal so as to be pivoted by movement thereof; a second roller rotatably supported on a second portion of said lever; a flexible control cable connected at one end to the throttle and at the other end to the vehicle, said cable being serially threaded along a first cable run from the throttle to said second roller, around said second roller and said first roller along a second cable run, and from said first roller to the vehicle along a third cable run whereby movement of the pedal causes pivoting of said lever and said second roller relative to said first roller thereby shifting said first cable run to cause controlled movement of the throttle and whereby adjusting the screw positions to said bracket relative to the throttle and the pedal by changing the relative lengths of said first and said third cable runs without changing the overall cable length.

* * * * *